(12) United States Patent
Yeh

(10) Patent No.: US 9,846,351 B2
(45) Date of Patent: Dec. 19, 2017

(54) PROJECTOR AND HEAT DISSIPATING METHOD FOR PROJECTOR

(71) Applicant: HON HAI PRECISION INDUSTRY CO., LTD., New Taipei (TW)

(72) Inventor: Chin-Wen Yeh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 140 days.

(21) Appl. No.: 14/981,177

(22) Filed: Dec. 28, 2015

(65) Prior Publication Data

US 2017/0168378 A1 Jun. 15, 2017

(30) Foreign Application Priority Data

Dec. 15, 2015 (CN) .......................... 2015 1 0928587

(51) Int. Cl.
*G03B 21/16* (2006.01)
*F21V 29/71* (2015.01)
*F21V 29/60* (2015.01)

(52) U.S. Cl.
CPC .............. *G03B 21/16* (2013.01); *F21V 29/60* (2015.01); *F21V 29/717* (2015.01)

(58) Field of Classification Search
CPC ........ H01J 61/52; H01J 21/523; H01J 61/526; F21V 29/503; G03B 21/16
USPC ............................... 353/55, 57; 362/265, 294
See application file for complete search history.

(56) References Cited

U.S. PATENT DOCUMENTS

| 4,419,716 A | * | 12/1983 | Koo | F21V 25/04 362/158 |
| 5,420,769 A | * | 5/1995 | Ahlgren | F21V 29/004 165/80.3 |
| 5,515,254 A | * | 5/1996 | Smith | F21V 5/04 362/293 |
| 6,609,816 B2 | * | 8/2003 | Ansari | F21V 23/026 362/265 |
| 6,874,912 B2 | * | 4/2005 | Hsu | F21V 29/02 362/294 |
| 7,063,423 B2 | * | 6/2006 | Fujimori | H04N 9/315 348/E5.137 |
| 7,350,926 B2 | * | 4/2008 | Fukuda | F21V 29/02 348/748 |
| 2007/0147043 A1 | * | 6/2007 | Lin | F21V 29/02 362/294 |
| 2009/0040765 A1 | * | 2/2009 | Van De Voorde | F21S 48/325 362/294 |

* cited by examiner

*Primary Examiner* — William C Dowling
(74) *Attorney, Agent, or Firm* — ScienBiziP, P.C.

(57) ABSTRACT

A projector includes a case, a system fan located in the case, a lamp securing module and a lamp. The lamp securing module includes a lamp holder and a lampshade integrated with the lamp holder. A plurality of heat conduction portions is located on the lampshade to be adhered to the lamp to guide the heat generated by the lamp to the lampshade, so that the system fan dissipates the heat from the lampshade. The disclosure further offers a heat dissipating method for the projector.

7 Claims, 6 Drawing Sheets

PROJECTOR AND HEAT DISSIPATING METHOD FOR PROJECTOR

FIELD

The subject matter herein generally relates to a projector and a heat dissipating method for the projector.

BACKGROUND

Projecting technology has become well developed over time. The projector also has been widely used in many situations, for example, meetings, exhibitions, promotion activities, teaching, academic conferences and home cinema. Generally, the projector emits light through lens and other optical devices to display devices for projecting images.

BRIEF DESCRIPTION OF THE DRAWINGS

Implementations of the present technology will now be described, by way of example only, with reference to the attached figures.

DETAILED DESCRIPTION

Figure 1:
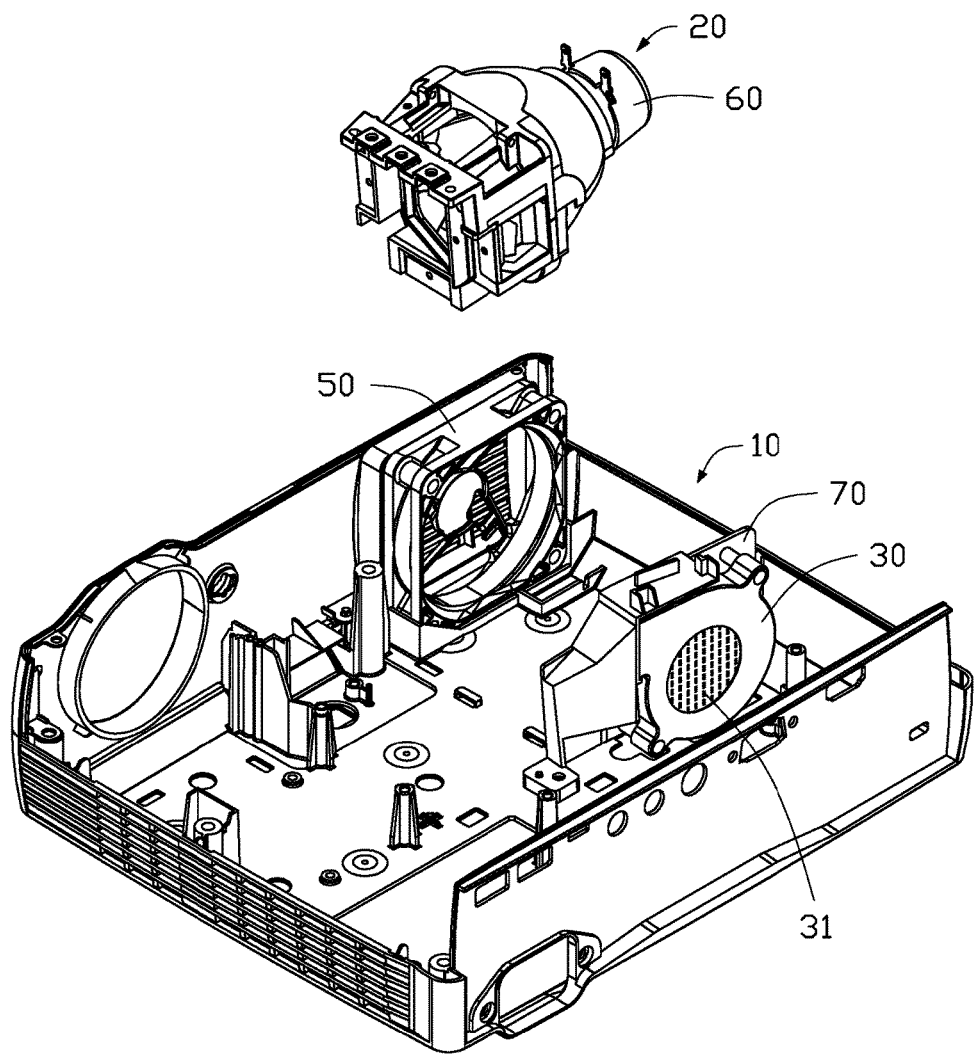
FIG. 1 is an exploded, isometric view of an example embodiment of a projector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

The present disclosure is described in relation to a projector. The projector includes a case, a system fan located in the case, and a lamp securing module. The lamp securing module includes a lamp holder and a lampshade integrated with the lamp holder and a lamp secured in the lamp securing module. A plurality of heat conduction portions are located on the lampshade to be adhered to the lamp guiding the heat generated by the lamp to the lampshade, so that the system fan dissipates the heat on the lampshade. The disclosure further offers a heat dissipating method for the projector.

FIG. 1 illustrates an embodiment of a projector 100. The projector 100 includes a case 10, a lamp securing module 20, a lamp 60, a fan 30 secured to the case 30, and a system fan 50 secured to a side of the case 10. In at least one embodiment, the lamp securing module 20 can be secured to the case 10, and the fan 30 and the system 50 can be used to dissipate heat generated by the lamp 60.

Figure 2:
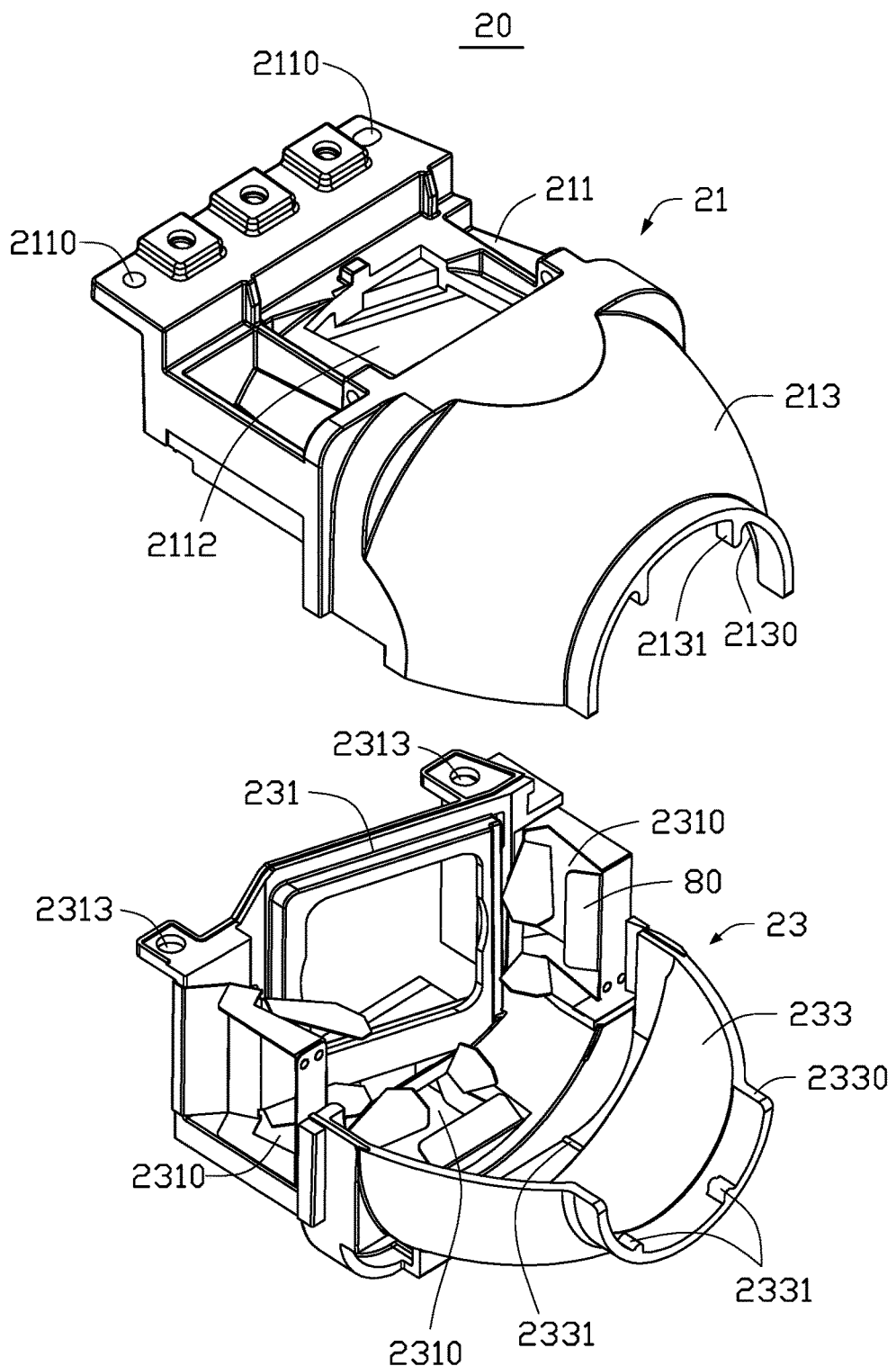
FIG. 2 is an exploded, isometric view of a lamping securing module of the projector of FIG. 1.
Figure 3:
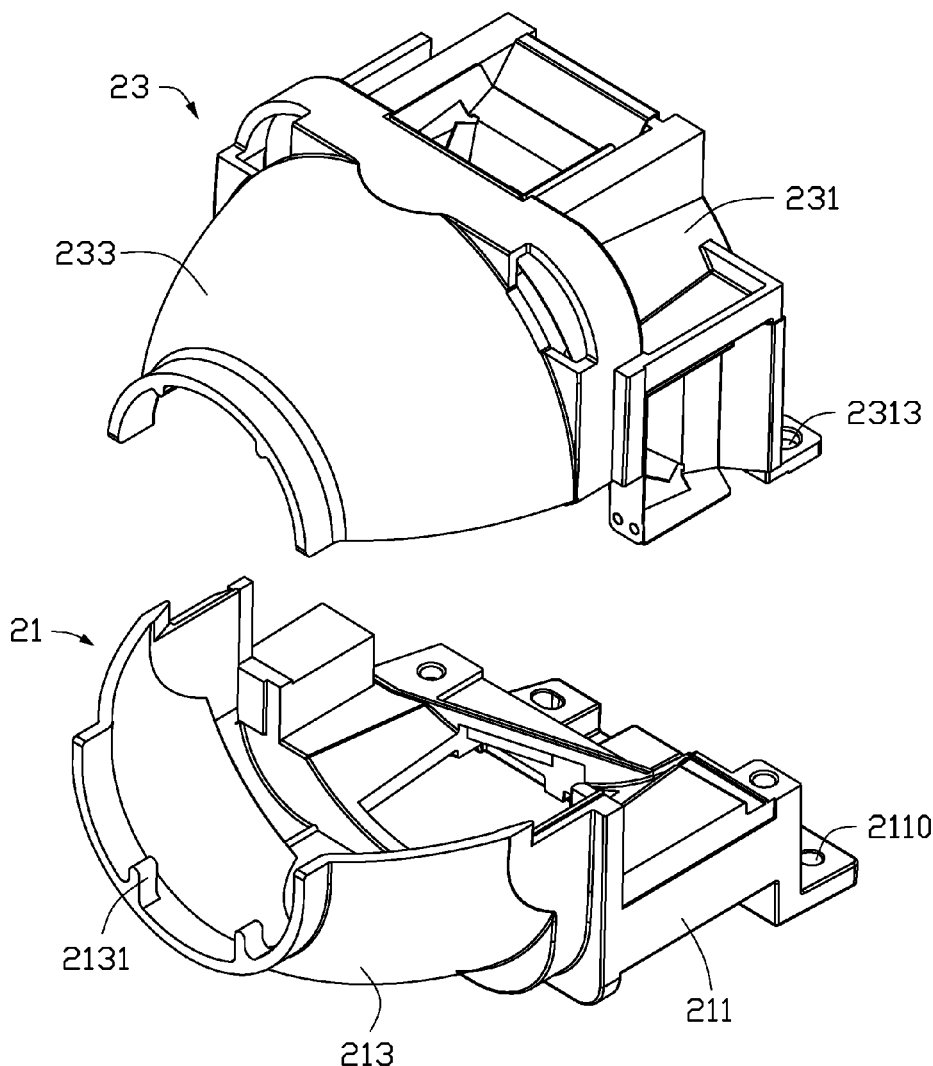
FIG. 3 is similar to FIG. 2, but viewed from a different angle.

FIGS. 2-3 illustrate an embodiment of the lamp securing module 20 of the projector 100. The lamp securing module 20 can include a first segment 21 and a second segment 23 separated from the first segment 21. In at least one embodiment, the first segment 21 can be clipped or secured to the second segment 23 by clips or screws.

The first segment 21 can include a first top portion 211 and a second top portion 213 extending from the first top portion 211. In at least one embodiment, the first top portion 211 is integrated with the second top portion 213. Two securing holes 2110 and a ventilation hole 2112 are defined in the first top portion 211. A clipping portion 2130 is located on the second top portion 213, and a plurality of heat conduction portions 2131 are located on an inner surface of the second top portion 213. In at least one embodiment, each of the plurality of heat conduction portions 2131 is a rib that extends from edges of the second top portion 213, allowing the plurality of heat conduction portions 2131 to be adhered to the lamp 60. Thus, the heat generated by the lamp 60 can be transmitted to the second top portion 213 by the plurality of heat conduction portions 2131, allowing dissipation by the system fan 50. In at least one embodiment, the second top portion 213 can be made of heat conduction material, such as magnalium. The second top portion 213 can be arcuate having a first radius.

The second segment 23 can include a first bottom portion 231 and a second bottom portion 233 extending from the first bottom portion 231. In at least one embodiment, the first bottom portion 231 is integrated with the second bottom portion 233. Three ventilation holes 2310 and two mounting holes 2313 are defined in the first bottom portion 231. The two mounting holes 2313 correspond to the two securing holes 2110. A clamping portion 2330, corresponding to the clipping portion 2130, is located on the second bottom portion 233, and a plurality of heat conduction portions 2331 are located on an inner surface of the second bottom portion 233. In at least one embodiment, each of the plurality of heat conduction portions 2331 is a rib that extends from edges of the second bottom portion 233, allowing the plurality of heat conduction portions 2331 to be adhered to the lamp 60. Thus, the heat generated by the lamp 60 can be transmitted to the second bottom portion 233 by the plurality of heat conduction portions 2331, allowing the system fan 50 to dissipate. In at least one embodiment, the second bottom portion 233 can be made of heat conduction material, such as magnalium. The second bottom portion 233 can be arcuate having a second radius less than the first radius. In at least one embodiment, the second radius can be equal to or larger than the first radius.

Figure 4:
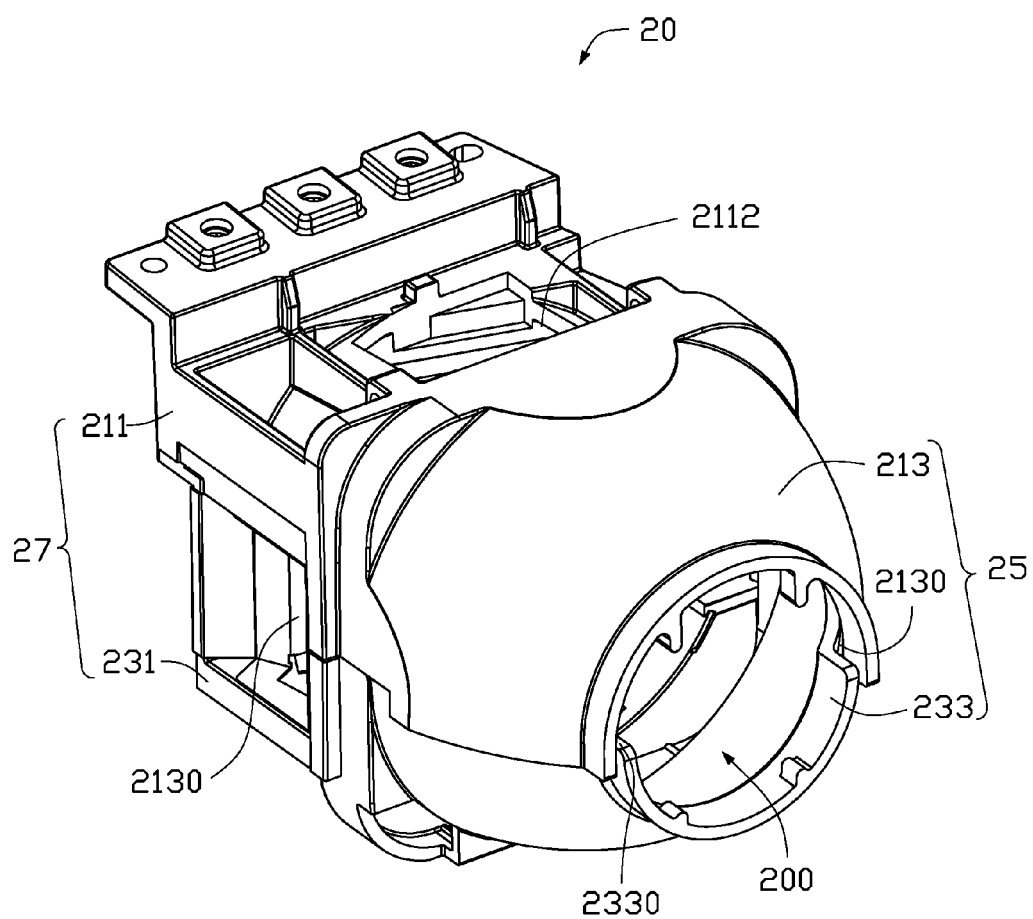
FIG. 4 is an assembled view of the lamp securing module of the projector of FIG. 2.

FIG. 4 illustrates an embodiment of the lamp securing module 20 of the projector 100. In assembly of the lamp securing module 20, the clipping portion 2130 is engaged with the clamping portion 2330, and the edges of the second bottom portion 233 can abut the inner surface of the second top portion 213. The two securing holes 2110 are aligned with the two mounting holes 2310, two screws (not shown) are engaged in the two securing holes 2110 and the two mounting holes 2310, to secure the first bottom portion 231 to the first top portion 211. Therefore, the first segment 21 can be secured to the second segment 23. The second top portion 213 and the second bottom portion 233 cooperatively define a lampshade 25, and the first top portion 211 and the first bottom portion 231 cooperatively define a lamp holder 27. The lampshade 25 and the lamp holder 27 cooperatively define a receiving space 200 for receiving the lamp 60.

Figure 5:
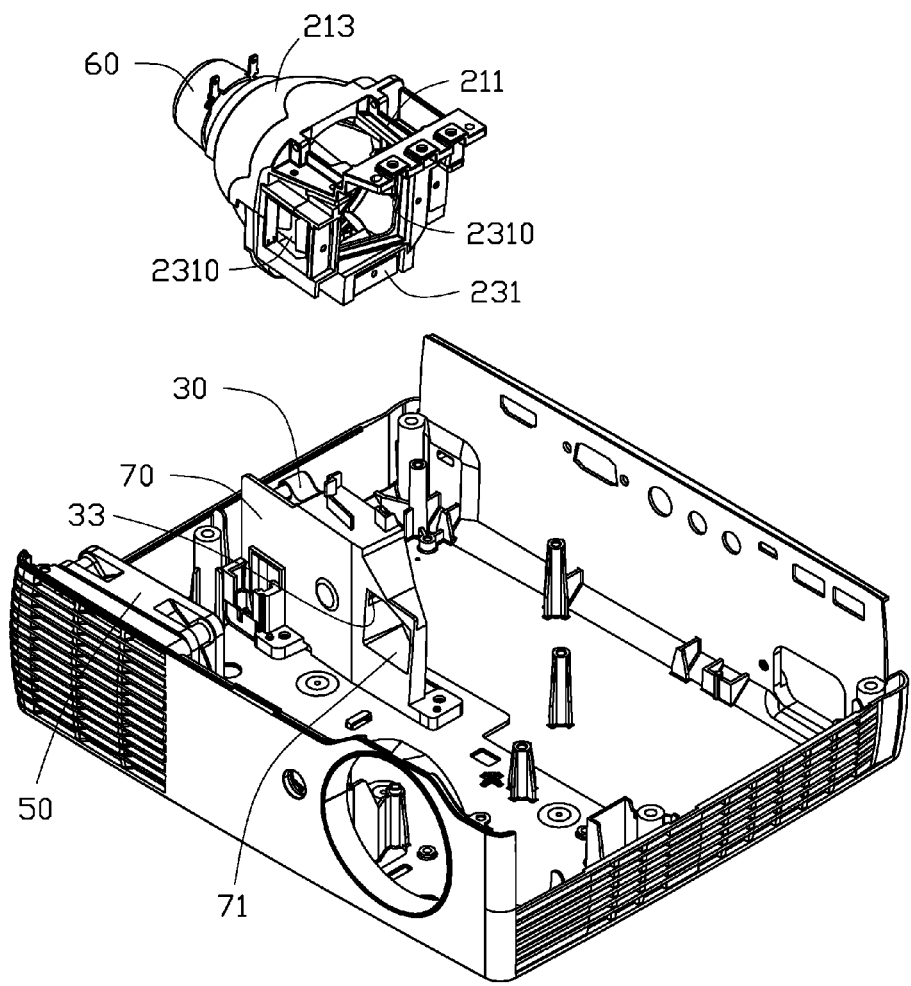
FIG. 5 is similar to FIG. 1, but viewed from a different angle.

FIG. 5 illustrates the lamp securing module 20 being secured to the case 10 (see FIG. 1). The fan 30 can be secured to the lamp holder 27 by a mounting tray 70. The fan 30 defines an air intake 31 (see FIG. 1) and an air outlet 33. A through hole 71, communicating with the ventilation hole 2310, is defined in the mounting tray 70 and corresponds to the air outlet 33. In use, air flows into the fan 30 via the air intake 31, out of the fan 30 via the air outlet 33, flows through the through hole 71 and the ventilation hole 2310, and out of the receiving space 200 via other ventilation holes 2310 for dissipating the lamp 60. In at least one embodiment, an air guiding duct 80 (see FIG. 2) can be attached to each ventilation hole 2310 for guiding air in or out of the receiving space 200. In at least one embodiment, the lamp securing module 20 can include four ventilation holes 2112, 2310. The fan 30 can be attached to a first one of the four ventilation holes 2112, 2310, when located in the case 10, air can flow into the receiving space 200 via the first one of the four ventilation holes 2112, 2310, and out of the receiving space 200 via other three of the four ventilation holes 2112, 2310. When two fans 30 are attached to two of the four ventilation holes 2112, 2310, air can flow into the receiving space 200 via the two of the four ventilation holes 2112, 2310, and out of the receiving space 200 via other two of the four ventilation holes 2112, 2310. When three fans 30 are attached to three of the four ventilation holes 2112, 2310, air can flow into the receiving space 200 via the three of the four ventilation holes 2112, 2310, and out of the receiving space 200 via remaining ventilation hole 2112, 2310.

Figure 6:
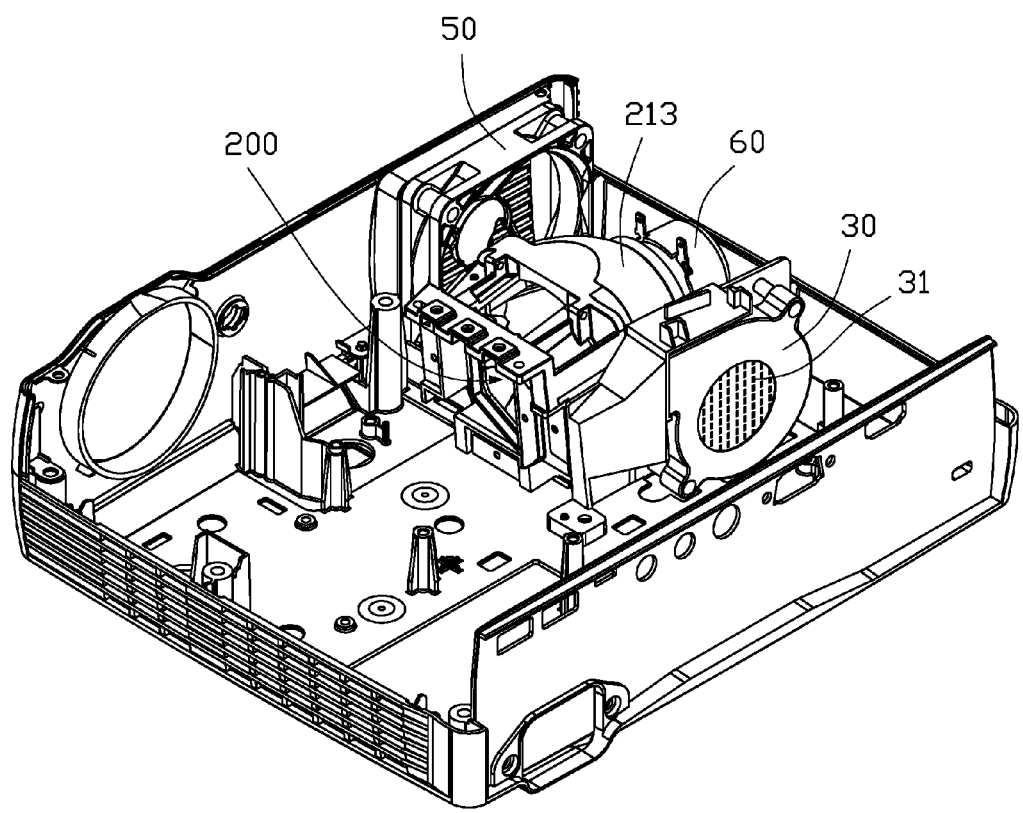
FIG. 6 is an assembled view of the projector of FIG. 1.

FIG. 6 illustrates the lamp securing module 20 working in the case 10 (see FIG. 1). In use, the lamp 60 works to generate heat. Air flows into the fan 30 via the air intake 31, out of the fan 30 via the air outlet 33, flows through the through hole 71 and the ventilation hole 2310, and out of the receiving space 200 via other ventilation holes 2310 for dissipating the lamp 60. In addition, the plurality of heat conduction portions 2131, 2331 is attached to the lamp 60; the heat generated by the lamp 60 can be transmitted to the second top portion 213 by the plurality of heat conduction portions 2131, allowing the system fan 50 to dissipate the heat.

The embodiments shown and described above are only examples. Many details are often found in the art such as the other features of a projector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A projector comprising:
   a case;
   a system fan located in the case; and
   a lamp securing module configured to secure a lamp, the lamp securing module comprising
      a first segment comprising a first top portion and a second top portion; and
      a second segment separated from the first segment, the second segment comprising a first bottom portion and a second bottom portion,
   wherein the first top portion and the first bottom portion cooperatively defines a lamp holder, and the second top portion and the second bottom portion cooperatively defines a lampshade; a plurality of heat conduction portions is located on the lampshade;
   wherein the plurality of heat conduction portions is configured to be adhered to the lamp to guide the heat generated by the lamp to the lampshade, and the system fan is configured to dissipate the heat on the lampshade.

2. The projector of claim 1, wherein the plurality of heat conduction portions extends from an inner surface of the lampshade, and the plurality of heat conduction portions is located edges of the lampshade to shied lights emitted by the lamp.

3. The projector of claim 1, wherein the lampshade is made of magnalium.

4. The projector of claim 1, wherein at least one ventilation hole is defined in the lamp holder, the projector further comprises at least one fan secured to the case, and the at least one fan is aligned with the at least one ventilation hole.

5. The projector of claim 4, wherein the at least one ventilation hole comprises four ventilation holes, and the four ventilation holes are located on four sides of the lamp holder.

6. The projector of claim 1, wherein the first segment comprises a clipping portion, and the second segment comprises a clamping portion clipped with the clipping portion.

7. The projector of claim 6, wherein a first radius is defined in the second top portion, a second radius, less than the first radius, is defined in the second bottom portion, when the clamping portion clipped with the clipping portion, the second bottom portion abuts an inner surface of the second top portion.

* * * * *